Figure 1:
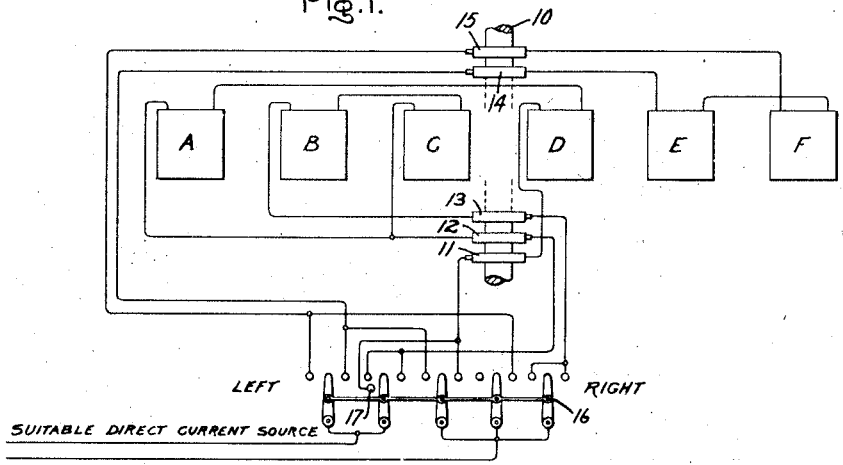

July 15, 1930.　　　　　P. L. ALGER　　　　　1,770,871

DOUBLE SPEED, SYNCHRONOUS, DYNAMO ELECTRIC MACHINE

Filed Aug. 12, 1929　　　　3 Sheets-Sheet 1

Inventor:
Philip L. Alger,
by Charles E. Tullar
His Attorney.

July 15, 1930.  P. L. ALGER  1,770,871

DOUBLE SPEED, SYNCHRONOUS, DYNAMO ELECTRIC MACHINE

Filed Aug. 12, 1929  3 Sheets-Sheet 2

Inventor:
Philip L. Alger,
by Charles E. Tullar
His Attorney

July 15, 1930.  P. L. ALGER  1,770,871
DOUBLE SPEED, SYNCHRONOUS, DYNAMO ELECTRIC MACHINE
Filed Aug. 12, 1929  3 Sheets-Sheet 3

Inventor:
Philip L. Alger,
by Charles E. Fuller
His Attorney.

UNITED STATES PATENT OFFICE

PHILIP L. ALGER, OF SCHENECTADY, NEW YORK, ASSIGNOR TO GENERAL ELECTR COMPANY, A CORPORATION OF NEW YORK

DOUBLE-SPEED, SYNCHRONOUS, DYNAMO-ELECTRIC MACHINE

Application filed August 12, 1929. Serial No. 385,262. REISSUED

My invention relates to dynamo electric machines and its principal object is to provide a novel and simple circuit arrangement for the exciting windings of the magnetic field of synchronous dynamo electric machines whereby they may be quickly changed from one number of poles to another number of poles, thus giving two efficient operating speeds when used either as a synchronous generator or a synchronous motor.

During the operation of water-wheel driven generators it frequently occurs that the head or quantity of water varies greatly with different seasons of the year, making the water-wheel operate inefficiently part of the time because the most efficient water-wheel speed depends on the head of water available, and also on the quantity of flow. Previously this difficulty has been met by using special water-wheels with vanes that could be adjusted to give the maximum efficiency for the head of water used, but this complicated the water-wheel construction. The maximum efficiency however can also be obtained by varying the speed of the water-wheel when the head of water varies. A water-wheel driven generator is usually connected to supply a fixed frequency circuit and any deviation from its rated speed will vary its frequency unless provision is made for altering the number of its poles. It is well known by those skilled in the art that with a fixed number of poles on a synchronous generator its frequency will vary in direct proportion to its speed. Therefore it becomes desirable to obtain the maximum efficiency of the water-wheel at different heads of water and simultaneously maintain normal frequency and these desirable results my invention accomplishes by changing the number of poles of the generator in a 2 to 3 ratio or vice versa. Thus for example with a normal head of water the generator may be connected for 2N poles, N being any even number, and the generator will be driven by the water-wheel at its normal speed and it will give its normal frequency. When the head, or quantity of flow of water is materially reduced the generator may be reconnected for 3N poles and the generator will be driven by the water-wheel at two-thirds of its normal speed, thereby maintaining most efficient operation and normal frequency.

It is well known to those skilled in the art that with a fixed frequency the speed of both synchronous and induction motors will vary in the inverse ratio at which their number of poles are increased or decreased. Certain types of large ships are normally propelled at their economical or so-called cruising speeds but for obvious reasons they must have a maximum emergency speed well above the cruising speed. In the past induction motors have been used for driving ships of this type and the increase in speed was obtained by changing the motor pole number. The induction motor has an undesirable low power factor and efficiency at the low or so-called cruising speeds and in addition has a greater weight than a synchronous motor of corresponding rating. It is therefore highly desirable to use two-speed synchronous motors both because they have a higher efficiency at the low or so-called cruising speeds and because their power factor can be adjusted to unity for any synchronous speed, thus giving two efficient operating speeds. This desirable result my invention accomplishes by changing the number of poles in a 3 to 2 ratio when the speed is to be increased to its maximum and conversely changing the number of poles in a 2 to 3 ratio when the speed is to be decreased to normal. This speed change could be obtained in a single speed motor driving a ship by changing the supply frequency, as for example by reducing the speed of the turbine driving the supply generator. This procedure is objectionable however because it greatly reduces the efficiency of the turbine. Hence the desirability of using two speed synchronous motors is evident.

My invention will be best understood from the following description considered in connection with the accompanying drawings while the features of my invention which are believed to be novel and patentable are pointed out in the claims appended hereto. Throughout the text and drawings 2S indicates the normal speed of the machine; 3S indicates a speed 50% above normal; 3N indicates the number of poles at the normal speed; 2N indicates the number of poles at 50% above the normal speed.

Figure 1A:
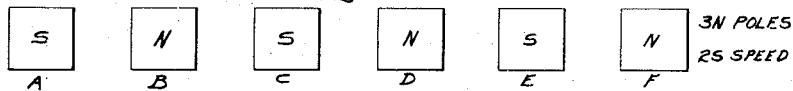
Figure 1B:
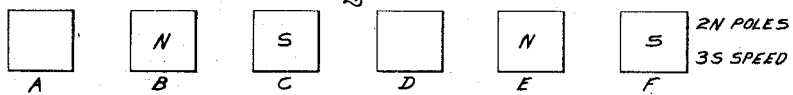
Figure 2:
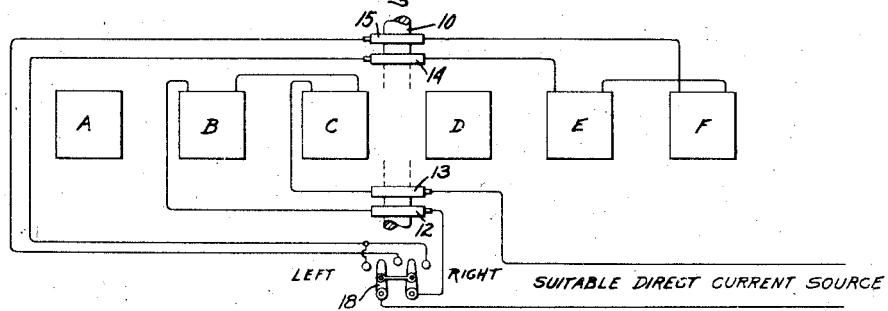
Figure 2A:
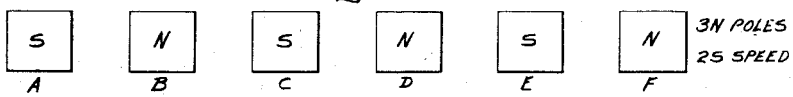

Fig. 1 represents the circuit connections of a revolving multi-polar field element of a two-speed synchronous dynamo electric machine embodying my invention, while Fig. 2 represents a modification of the circuit arrangement shown in Fig. 1. Fig. 1A represents the polarity of the field element when it is connected for 2S speed and 3N poles, while Fig. 1B represents the polarity of the field element when its is connected for 3S speed and 2N poles, both Figs. 1A and 1B referring to the circuit arrangement shown in Fig. 1. Fig. 2A represents the polarity of the field element when it is connected for 2S speed and 3N poles, while 2B represents the polarity of the field element when it is connected for 3S speed and 2N poles, both Figs. 2A and 2B referring to the circuit arrangement shown in Fig. 2. Figs. 3, 4, 5 and 6 represent flux curves which will be referred to in explaining my invention.

Referring to Figs. 1 and 2, in both of which the field element is represented as developed on a plane surface, 10 represents the shaft of a multipolar synchronous dynamo electric machine of the revolving pole type, 11, 12, 13, 14 and 15 represent the collector rings, 16 in Fig. 1, represents a five-pole double-throw reversing switch with one extra switch prong 17, 18 in Fig. 2 represents a two-pole, double-throw reversing switch. A, B, C, D, E and F represent six salient poles which constitute a field unit and any number of such field units can be employed that will give the required number of poles. For illustrative purposes I am showing only one field unit representing a field that can be changed from six poles to four poles or vice versa.

Fig. 1 shows the six salient poles connected in three separate circuit groups. Group 1 consists of exciting coils assembled on poles A and D which are opposite to each other, groups 2 and 3 consisting of exciting coils assembled on the adjacent pole pairs B and C and E and F respectively, groups 2 and 3 being separated by the poles of group 1. The circuit group 1 consisting of every third pole piece should preferably have the ratio of the width of these pole pieces to the width of the pole pieces of the other groups represented by any value from 1.00 to .25 inclusive to obtain the best results. The width ratio of 1.00 gives normal low speed characteristics with poor high speed characteristics, while a low width ratio gives good high speed characteristics at some sacrifice in low speed characteristics.

The two coils of each group are connected in series but are reversed in connection so as to produce opposite polarities as shown in Fig. 1A, and their respective coil ends are connected to collector rings 11 and 12, 12 and 13, 14 and 15, collector ring 12 functioning as a common connection for groups 1 and 2. The six-pole condition, is obtained by connecting the three circuit groups in series or parallel to a suitable direct current source through switch 16. The four-pole condition is obtained by leaving group 1 open-circuited, or preferably independently short-circuited, leaving the connections to the direct current source of either group 2 or 3 unchanged, and reversing the connections to the direct current source of the remaining group both groups remaining connected in series or parallel to the direct current source. For illustrative purposes I have shown group 1 short-circuited, group 2 unchanged, and group 3 reversed. By tracing the current flow it is seen that with the switch 16 closed in the right position the three circuit groups are connected in parallel to the direct current source and the connections are such that six poles of alternate polarity are produced as shown in Fig. 1A, thus giving the 3N, 2S condition. By closing the switch 16 in the left position, group 1 is short circuited, group 2 is unchanged, group 3 is reversed, groups 2 and 3 remaining connected in parallel to the direct current source, and the connections are such that four poles of alternate polarity are produced as shown in Fig. 1B, thus giving the 2N, 3S condition. It is evident that under the four-pole condition the two short-circuited coils in group 1 do not use any direct current. It is well known to those skilled in the art that with the machine running in exact synchronism with the line frequency which is the predominating operating condition the two short-circuited coils do not cut any magnetic flux, hence a voltage will not be induced in them and current will not flow in them. But a changed operating condition tending to make the machine hunt will cause the short circuited coils to cut magnetic flux, hence a voltage will be induced in them and current will flow through them causing them to function as damper windings and thus exert a steadying influence on the machine by preventing speed oscillations and consequently help to keep the machine in synchronism with the line frequency. Any suitable switching apparatus may be employed to obtain the six-pole and four-pole conditions and short-circuit the group 1 coils in the four-pole condition. For illustrative purposes I have shown in Fig. 1 a properly connected five-pole, double-throw switch 16 for this purpose with one extra switch prong 17 at the left position.

Figure 2B:
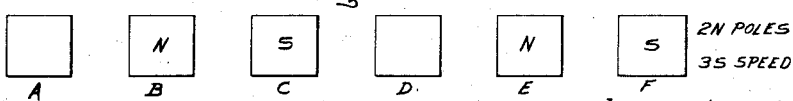

Referring to Fig. 2 which represents a modification of the circuit arrangement shown in Fig. 1, it is seen that we have the six salient poles arranged in three separate groups. Group 1 consists of poles A and D which are opposite to each other but are without exciting coils and hence are unable to produce magnetic flux. Groups 2 and 3 consist of exciting coils on the adjacent poles B and C and E and F respectively, groups 2 and 3 being separated by the poles of group 1. The group 1, consisting of every third pole piece without exciting coils, should preferably have the ratio of the width of these pole pieces to the width of the pole pieces of the other groups represented by any value from 1.00 to .25 inclusive, to obtain the best results, the choice depending on the relative high and low speed characteristics desired. The two coils of each circuit group are connected in series but reversed in connection so as to produce opposite polarities as shown in Fig. 2A and their respective coil ends are connected to collector rings 12 and 13, and 14 and 15 respectively, collector ring 11 shown in Fig. 1 being omitted as unnecessary. Both circuit groups are connected to a suitable direct current source through switch 18. The six-pole condition is obtained by closing the switch 18 to the right and as can be seen by tracing the current flow the connections are such that the two-circuit groups are connected in series to the direct current source and there are produced two pairs of poles with opposite polarities in each pair and with like poles of each pair separated by the unexcited poles A and D. It is well known to those skilled in the art that when a metal section susceptible to magnetization has like poles at the ends, they will cause the center of such metal section to have an induced pole of the opposite polarity commonly known as a consequent pole. This is the situation existing in the six-pole connection and therefore the unexcited salient poles A and D will become consequent poles, each one having an opposite polarity to the pair of like poles it separates, thus producing six poles of alternate polarity as shown in Fig. 2A, giving the 3N, 2S condition. To obtain the four-pole condition both circuit groups remain connected in series but one of the circuit groups must have its connections to the direct current source reversed. For illustrative purposes I have shown the group comprising E and F thus reversible. By closing the switch 18 to the left and tracing the current flow it can be seen that the two circuit groups are connected in series to the direct current source with the current reversed in poles E and F thus producing four poles of alternate polarity as shown in Fig. 2B, giving the 2N, 3S condition. Any suitable switching apparatus may be employed to obtain the six pole and four pole conditions, but for illustrative purposes I have shown in Fig. 2 a properly connected double pole, reversing switch 18 for this purpose.

The following theoretical discussion is well known to those skilled in the art and when considered in connection with the drawings will be of assistance in understanding the necessities for and the advantages of my invention. In Fig. 1 if the ratio of the width of the pole pieces A and D to the width of the other pole pieces is represented by 1.00, then under the 3N pole condition there are six poles of alternate polarity with a total peripheral pole arc of 1080 electrical degrees as represented by the line 0 to the line 1080 in Fig. 3. Each pole piece produces a flux occupying 180 electrical degrees as shown for example by the line 0 to the line 1080 in Fig. 3 and the arcs between the centers of adjacent poles are 180 electrical degrees as shown for example by the line 90 to the line 270 and the arc between the centers of poles A and D is 540 electrical degrees as shown for example by the line 270 to the line 810 in Fig. 3. Therefore we have in Fig. 3 a standard magnetization and excitation with a sine wave flux of maximum strength resulting in a standard motor and the most efficient operating condition because the efficiency is that of standard motor.

Figure 3:
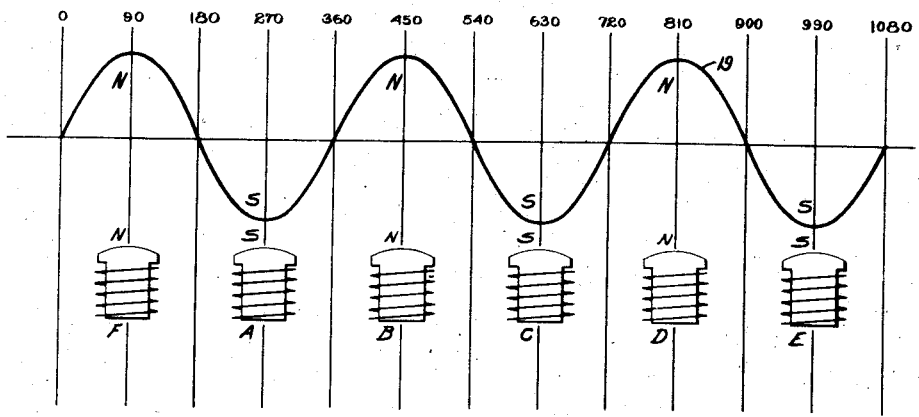
Figure 4:
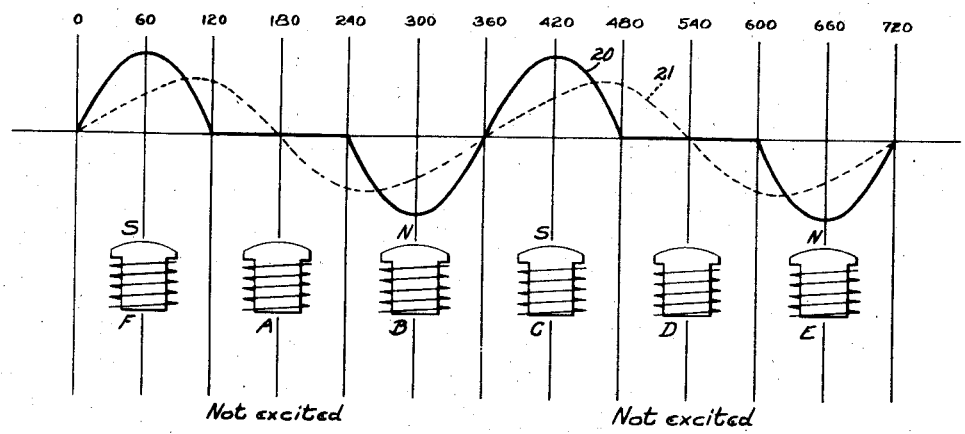

Fig. 4 represents the same pole pieces as in Fig. 3, but the field element is now connected for 2N poles thereby giving four poles of alternate polarity. The full line curve 20 in Fig. 4 represents the flux produced by the active exciting coils and the two horizontal lines of curve 20 show that zero magnetic flux is produced by the poles A and D which are not excited in the 2N condition. The immediate impression might be that the irregular flux wave as represented by curve 20 will produce an inferior if not an entirely impractical machine. The advance of the art has however made it possible to design such machines efficiently principally by arrangement of the armature windings to open circuit the voltages produced by the non-useful harmonics of the magnetic flux. The resultant characteristics of the machine are such as would be produced by a machine having a magnetic flux represented by the dotted line curve 21 in Fig. 4 and which is almost a sine wave. As there are four poles of alternate polarity therefore the total peripheral arc is 720 electrical degrees as represented by the lines 0 to the line 720 in Fig. 4, and the arc of each pole of the resulting flux is 180 electrical degrees as shown for example by the line 0 to the line 180 in Fig. 4. As there are six pole pieces and the ratio of the width of the pole pieces A and D to the width of the other pole pieces is represented by 1.00, therefore the arc between the centers of adjacent pole pieces will be one-sixth of the total polar arc of 720 electrical degrees or equal to 120 electrical degrees as shown for example by the line 0 to the line 120 of Fig. 4 and the arc between the centers of poles A and D is 360 electrical degrees as shown for example by the line 180 to the line 540 in Fig. 4. In Fig. 4 there is a standard excitation with a resulting flux wave of lower strength than that of Fig. 3 and consequently the efficiency of the machine in Fig. 4 is lower than that of Fig. 3. Also Fig. 4 represents a very poor magnetization of a machine embodying my invention because the ratio of the width of an unexcited area to an excited area is represented by 1.00 and yet I have found by actual and exhaustive tests that the machine was entirely normal and practical except that its efficiency was lower than that of Fig. 3.

It is evident that to obtain the best possible flux condition as the ratio of the width of the poles A and D to the width of the other poles is reduced from 1.00 to .25 inclusive, then the ratio of the pole arcs occupied by the flux of poles A and D to the pole arcs occupied by the flux of poles B, C, E and F should be correspondingly decreased. It is pertinent at this point to show the arcs occupied by the flux of the poles and the arcs between the centers of the poles with the ratios 1.00 and .25 respectively. Under the 3N pole condition there are six poles of alternate polarity with a total peripheral arc of 1080 electrical degrees as represented by the line 0 to the line 1080 in Fig. 5. With a ratio of 1.00 the arc occupied by the flux of every pole will be 180 electrical degrees as shown in Fig. 3 and the arc between the centers of adjacent poles will be 180 electrical degrees as shown in Fig. 3. With a ratio of .25 the arc occupied by the flux of poles A and D will each be .25 of the arc occupied by the flux of poles B, C, E and F and if W is assumed to be the arc occupied by the flux of poles B, C, E and F then the total pole arc of the machine which is 1080 electrical degrees can be represented by 4.5 W and therefore W is 240 electrical degrees and .25 W is 60 electrical degrees. It is evident that the arc between the centers of poles B and C or E and F is 240 electrical degrees as shown for example by the line 420 to the line 660 in Fig. 5 and the arc between the centers of either pole A or D and its adjacent poles is 150 electrical degrees as shown for example by the line 270 to the line 420 in Fig. 5.

Figure 5:
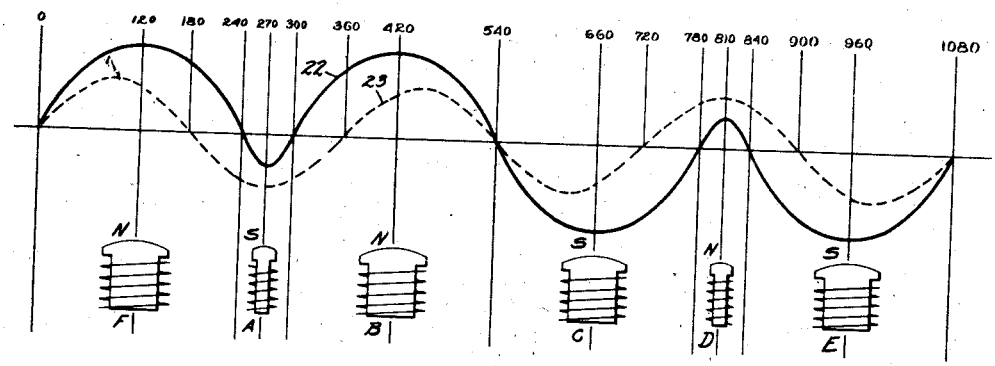

To illustrate a most striking example I have selected the ratio .25 in Fig. 5. Inspection of Fig. 5 shows that the arcs occupied by the flux of poles A and D are each 60 electrical degrees as shown for example by the line 240 to the line 300 whereas the arcs occupied by the flux of poles B, C, E and F are each 240 electrical degrees as shown for example by the line 0 to the line 240, thus maintaining the .25 ratio. Further inspection of Fig. 5 shows that the arc between the center of either pole A or D and the center of its adjacent pole is 150 electrical degrees as shown for example by the line 120 to the line 270, the arcs between the centers of either of the adjacent poles B and C or E and F is 240 electrical degrees as shown for example by the line 420 to the line 660 and the arc between the centers of the poles A and D is 540 electrical degrees as shown for example by the line 270 to the line 810. The full line curve 22 in Fig. 5 represents the flux produced by the exciting coils and the small flux areas are those produced by the poles A and D. For reasons similar to those stated in the description accompanying Fig. 3 the resultant flux can be represented by the dotted line curve 23 in Fig. 5. Curve 23 shows six poles of alternate polarity with a total peripheral arc of 1080 electrical degrees as shown by the line 0 to the line 1080 and an arc for the flux of each pole of 180 electrical degrees as shown for example by the line 0 to the line 180. Curve 23 is almost a sine wave but is of lower strength than curve 19 in Fig. 3 and consequently the efficiency is lower than that of Fig. 3.

Figure 6:
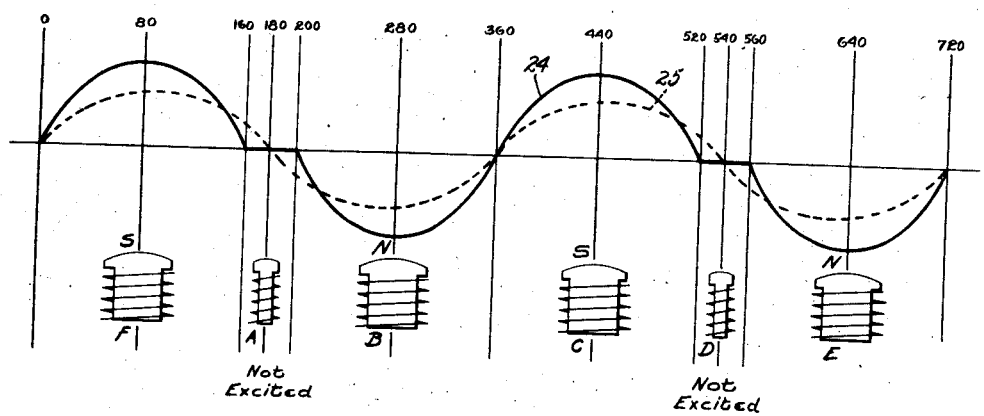

Fig. 6 represents the same pole pieces as in Fig. 5 but the field element is now connected for 2N poles, thereby giving four poles of alternate polarity. The full line curve 24 in Fig. 6 represents the flux produced by the active exciting coils and the two horizontal lines of curve 24 show that zero magnetic flux is produced by the poles A and D which are not excited in the 2N condition. For reasons similar to those stated in the description accompanying Fig. 3 the resultant flux can be represented by the dotted line curve 25 in Fig. 6. Curve 25 shows four poles of alternate polarity with a total peripheral arc of 720 electrical degrees, as shown by the line 0 to the line 720 in Fig. 6 and the arc of each pole of the resulting flux is 180 electrical degrees as shown for example by the line 0 to the line 180 in Fig. 6. If W is assumed to be the arc occupied by the flux of any of the poles B, C, E or F, then .25 W is the arc occupied by the flux of each of the poles A and D, then the total pole arc of the machines which is 720 electrical degrees can be represented by 4.5 W and W is 160 and .25 W is 40 electrical degrees. Inspection of Fig. 6 shows that the arcs occupied by the flux of poles A and D are each 40 electrical degrees as shown for example by the line 160 to the line 200, whereas the arcs occupied by the flux of poles B, C, E and F are each 160 electrical degrees as shown for example by the line 0 to the line 160. Further inspection of Fig. 5 shows that the arc between the center of either pole A or D and the center of its adjacent pole is 100 electrical degrees as shown for example by the line 80 to the line 180, the arcs between the centers of either of the adjacent poles B and C or E and F is 160 electrical degrees as shown for example by the line 280 to the line 440 and the arc between the centers of the poles A and D is 360 electrical degrees as shown for example by the line 180 to the line 540. Curve 25 in Fig. 6 is nearly a sine wave but is of lower strength than curve 19 in Fig. 3 and consequently the efficiency is lower than that of Fig. 3.

To recapitulate, the arcs occupied by the flux each of the poles A and D will vary from a maximum of 180 to a minimum of 40 electrical degrees; the arcs occupied by the flux of each of the poles B, C, E and F will vary from a maximum of 240 to a minimum of 120 electrical degrees; the arcs between the center of either pole A or D and the center of its adjacent pole will vary from a maximum of 180 to a minimum of 100 electrical degrees; the arcs between the centers of the adjacent poles B and C or E and F will vary from a maximum of 240 to a minimum of 120 electrical degrees and the arcs between the centers of poles A and D will vary from a maximum of 540 to a minimum of 360 electrical degrees.

If flux curves are drawn for each of the conditions shown in Figs. 3, 4, 5 and 6, but using only four exciting coils as explained in connection with Fig. 2, it will be seen that the arcs occupied by the flux of the various poles and the arcs between the centers of the various poles will be the same as that of the corresponding condition using six exciting coils. It is therefore unnecessary to illustrate the curves of those conditions using four exciting coils. Although all of the variations described give a lower efficiency than that of the standard motor represented in Fig. 3, yet it must be remembered that because of the higher speed the 2N 3S conditions may give a greater actual horsepower output than that of the 3N and 2S standard motor represented in Fig. 3. By the judicious selections of either four or six exciting coils and the ratio that the width of every third pole piece that is in the same group bears to the width of the other pole pieces, there can be obtained a great variation in the efficiencies at high and low speeds. Thus, for example, if it is desired to have a large output at high speed and only a relatively very small output at low speed, then the efficiency at high speed should be as high as possible even if obtained at a sacrifice of the low speed efficiency and especially is this true if the machine is to run at high speed the greater part of the time. Conversely, if only a small output is desired at high speed, then the efficiency at low speed should be as high as possible even if obtained at sacrifice of the high speed efficiency and especially is this true if the machine is to run at low speed the greater part of the time. Thus if the ratio of the width of every third pole piece that is in the same group to the width of the other pole pieces is represented by 1.00 the low speed is very efficient and the high speed efficiency is lower as stated in the descriptions accompanying Figs. 3 and 4. On the other hand, as the ratio of the width of every third pole piece in the same group to the width of the other pole pieces is being decreased from 1.00 to .25 the high speed efficiency increases and the low speed efficiency decreases as stated in the descriptions accompanying Figs. 5 and 6. The following is an outstanding example of the commercial applications in which the flexibility of my invention is very useful. Certain types of large ships are normally propelled at their economical or so-called cruising speeds but for obvious reasons they must have a maximum emergency speed well above the cruising speeds. But the power required to drive a screw propelled ship increases approximately as the cube of the speed. But as the ship runs at the low speed the greater part of the time therefore the motor driving it should be designed with a high efficiency at the low speed, whereas if the ship is to run at high speed most of the time the motor efficiency should be high at the high speed. Another example is a centrifugal pump where the power required to drive it also increases as the cube of the speed.

In a copending application, Serial No. 372,765 Patent No. 1,752,871, April 1, 1930, Robert W. Wieseman and assigned to the assignees of the present invention, there is disclosed and broadly claimed a novel method for changing the number of poles in a synchronous dynamo electric machine in a 2 to 3 ratio and vice versa. Briefly described this invention consists of 4N large salient poles and 4N small salient poles, N being any even number. The small salient poles are arranged in pairs and every pole piece has an exciting coil. The six-pole condition is obtained by so connecting all the exciting coils that every pair of small salient poles acts as a single pole, whereas the four-pole conditions is obtained by so connecting all the exciting coils that every small salient pole has the polarity of its adjacent large salient pole. It can be seen that Mr. Wieseman's invention uses 8 pole pieces and 8 exciting coils per field unit under both the 6-pole and 4-pole condition, while my invention uses only 6 pole pieces and 6 exciting coils at the most per field unit. Mr. Wieseman's invention probably gives the most efficient design in certain cases while my invention has the flexibility of obtaining any relative efficiency at high and low speeds and thus both invention have their sphere of usefulness.

The stator windings of the machine have not been shown but it will be understood that they are wound so as to be capable of connecting for either 2N or 3N poles, N being any even number. This can be accomplished by any of the methods used in induction motors as for example the one disclosed in United States Patent 841,609, granted to Ernst F. W. Alexanderson. When a machine embodying my invention is started as a motor the field circuit will be open or short-circuited through a resistance or reactance and the stator windings will normally be connected for 3N poles. When the machine reaches the speed corresponding to this connection the field windings may be energized for 3N poles if it is desired to operate at this condition. If it is desired to operate at the 2N pole condition the field circuit is left unenergized and the stator windings are changed over by an appropriate pole changing switch to 2N poles and when the machine reaches the speed corresponding to this connection the field may be energized for the 2N pole condition. It is evident that during both starting conditions with either the three-circuit or the two-circuit connection the induced potential across the end connections of each circuit group of the field will be no more than one-half of what it would be if all the groups were connected in series and this is an evident advantage.

It is evident that the ratio of the width of every third pole piece comprising one group to the width of the other pole pieces may even be represented by a value somewhat above 1.00 without departing from the spirit and scope of my invention.

While I have described my invention in connection with a machine of the revolving pole type with a certain number of poles it is evident that my invention is equally applicable to a machine with a stationary field or a different number of poles and therefore I do not wish to limit my invention to the type herein described. Also, while I have herein described my invention in connection with its use in water wheel generators or as synchronous motors for large ships, it is evident that the uses described were only illustrative and that my invention is equally applicable for use in any synchronous generator or synchronous motor whenever it is desired to change the number of poles in the herein described ratios and therefore I do not wish to limit my invention to the uses herein described.

In accordance with the provisions of the patent statutes, I have described the principles of operation of my invention together with the apparatus which I now consider to represent the best embodiment thereof, but I desire to have it understood that such other modifications as fall fairly within the true spirit and scope of my invention are intended to be included within the scope of the appended claims.

What I claim as new and desire to secure by Letters Patent of the United States, is:

1. In a dynamo electric machine, a field element therefor, consisting of one or more field units, each unit consisting of six pole pieces with exciting coils on these pole pieces connected in three separate circuit connecting groups with the ratio of the width of every third pole piece comprising one group to the width of the other pole pieces represented by any value from 1.00 to .25 inclusive, means for energizing the exciting coils, and means for disconnecting one of the circuit groups from the direct current source and reversing the current in one of the other circuit groups thereby changing the field element from 3N poles of alternate polarity to 2N poles of alternate polarity and vice versa, N being any even number.

2. In a synchronous dynamo electric machine of a type having windings that may be connected for either 2N poles or 3N poles, the said machine having a field element consisting of one or more field units, each unit consisting of six poles pieces with exciting coils on the pole pieces connected in three separate circuit connecting groups, two of these circuit groups consisting each of a pair of adjacent poles, said pairs of poles having approximately equal pole arcs between the centers of their pole pieces and each of said pole arcs having a value lying between approximately 240 and 180 electrical degrees inclusive considering the 3N pole connection and between approximately 160 and 120 electrical degrees inclusive considering the 2N pole connection, the third circuit group consisting of a pair of pole pieces with the ratio of their width to the width of the other pole pieces represented by any value from 1.00 to .25, inclusive, and the pole pieces of said third circuit group having a pole arc between their centers of approximately 540 electrical degrees considering the 3N pole connection and 360 electrical degrees considering the 2N pole connection, means for energizing the exciting coils, and means for disconnecting the last mentioned group from the direct current source and reversing the current in one of the other groups thereby changing the field element from 3N poles of alternate polarity to 2N poles of alternate polarity and vice versa, N being any even number.

3. A field element for a dynamo electric machine consisting of one or more field units, each unit consisting of six pole pieces with exciting coils on these pole pieces connecting in three separate circuit connecting groups with the ratio of the width of every third pole piece comprising one group to the width of the other pole pieces represented by any value from 1.00 to .25, inclusive, means for energizing the exciting coils, and means for disconnecting one of the circuit groups from the direct current source and reversing the current in one of the other circuit groups, thereby changing the field element from 3N poles of alternate polarity in which every pole piece is magnetized by its exciting coil to 2N poles of alternate polarity in which N pairs of adjacent poles are magnetized by their exciting coils with the unexcited poles approximately midway between the pairs of adjacent excited poles and with a pole arc between the centers of the unexcited poles of approximately 360 electrical degrees, and vice versa, N being any even number.

4. In a dynamo electric machine, a field element therefor consisting of one or more field units, each unit consisting of six pole pieces with exciting coils on at least two pairs of pole pieces connected in at least two separate circuit connecting groups, the remaining pole pieces having a ratio of their width to the width of the other pole pieces represented by any value from 1.00 to .25 inclusive, means for energizing the exciting coils, and means for reversing the current in one of the groups thereby changing the field element from 3N poles of alternate polarity to 2N poles of alternate polarity and vice versa, N being any even number.

5. In a synchronous dynamo electric machine of a type having windings that may be connected for either 2N or 3N poles, the said machine having a field element consisting of one or more field units, each unit consisting of six pole pieces with exciting coils on at least two pairs of pole pieces connected in at least two separate circuit connecting groups, each group consisting of a pair of adjacent poles said pairs of poles having approximately equal pole arcs between the centers of their pole pieces and each of said pole arcs having a value lying between approximately 240 and 180 electrical degrees inclusive considering the 3N pole connection and between approximately 160 and 120 electrical degrees inclusive considering the 2N pole connection, the remaining pole pieces having a ratio of their width to the width of the other pole pieces represented by any value from 1.00 to .25 inclusive, the said remaining pole pieces being situated approximately midway between the pairs of adjacent poles, the pole arm between said remaining pole pieces being approximately 540 electrical degrees considering the 3N connection and approximately 360 electrical degrees considering the 2N connection, means for energizing the exciting coils, and means for reversing the current in one of the pairs of adjacent poles thereby changing the field element from 3N poles of alternate polarity to 2N poles of alternate polarity and vice versa, N being any even number.

6. A field element for a dynamo electric machine consisting of one or more field units, each unit consisting of six pole pieces with exciting coils on at least two pairs of pole pieces connected in at least two separate circuit connecting groups, the remaining pole pieces having a ratio of their width to the width of the other pole pieces represented by any value from 1.00 to .25 inclusive, means for energizing the exciting coils, and means for reversing the current in one of the groups thereby changing the field element from 3N poles of alternate polarity in which at least two pairs of poles are magnetized by their exciting coils to 2N poles of alternate polarity in which N pairs of adjacent poles are magnetized by their exciting coils with the unexcited poles approximately midway between the pairs of adjacent excited poles and with a pole arc between the centers of the unexcited poles of approximately 360 electrical degrees and vice versa, N being any even number.

7. A field element for a dynamo electric machine consisting of one or more field units, each unit consisting of six pole pieces, exciting coils on at least two pairs of pole pieces connected in at least two separate circuit connecting groups, means for energizing the exciting coils, and means for reversing the current in one of the groups thereby changing the field element from 3N poles of alternate polarity to 2N poles of alternative polarity and vice versa, N being any even number.

8. In a synchronous dynamo electric machine of a type having windings that may be connected for either 2N or 3N poles, the said machine having a field element consisting of one or more field units, each unit consisting of six pole pieces, exciting coils on at least two pairs of pole pieces connected in at least two separate circuit connecting groups, means for energizing the exciting coils, and means for reversing the current in one of the groups thereby changing the field element from 3N poles of alternate polarity in which at least two pairs of poles are magnetized by their exciting coils to 2N of alternate polarity in which N pairs of adjacent poles are magnetized by their exciting coils with the unexcited poles approximately midway between the pairs of adjacent excited poles, N being any even number.

In witness whereof, I have hereunto set my hand this 10th day of August, 1929.

PHILIP L. ALGER.